United States Patent [19]

Paavola

[11] Patent Number: 4,972,750

[45] Date of Patent: Nov. 27, 1990

[54] BLADE CONSTRUCTION FOR USE IN SLICING MATERIAL WEBS

[75] Inventor: Antti Paavola, Helsinki, Finland

[73] Assignee: Valmet Paper Machinery Inc., Helsinki, Finland

[21] Appl. No.: 370,163

[22] Filed: Jun. 20, 1989

Related U.S. Application Data

[63] Continuation of Ser. No. 208,163, Jun. 16, 1988, abandoned.

[30] Foreign Application Priority Data

Jun. 26, 1987 [FI] Finland ........ 872829

[51] Int. Cl.[5] ........ B23D 19/04

[52] U.S. Cl. ........ 83/500; 83/505; 83/675

[58] Field of Search ........ 83/500-504, 83/495, 496, 665, 675, 676, 345, 343, 505; 76/101 R, 101 A, 45

[56] References Cited

U.S. PATENT DOCUMENTS

| | | | |
|---|---|---|---|
| 3,186,282 | 6/1965 | Waterhouse | 83/500 |
| 3,956,957 | 5/1976 | Corse | 83/500 |
| 4,157,672 | 6/1979 | Frye | 83/500 |
| 4,254,677 | 3/1981 | Evans | 83/504 |
| 4,273,561 | 6/1981 | Villalobos | 83/171 |
| 4,274,319 | 6/1981 | Frye et al. | 83/500 |
| 4,280,386 | 7/1981 | Ward, Sr. | 83/500 |
| 4,319,889 | 3/1982 | Villalobos | 83/171 |
| 4,406,201 | 9/1983 | Barnes et al. | 83/675 |
| 4,485,706 | 12/1984 | Disharoon | 83/856 |
| 4,520,704 | 6/1985 | Olshansky et al. | 83/500 |

*Primary Examiner*—Frank T. Yost
*Assistant Examiner*—Scott A. Smith
*Attorney, Agent, or Firm*—Dellett, Smith-Hill and Bedell

[57] ABSTRACT

The present invention concerns a blade construction (10) for use in longitudinally cutting (in slicing) material webs, such as various paper and cardboard webs, films and recorder tapes, etc., with said cutter a material web being longitudinally parted into partial webs, the cutter consisting of a blade construction (10) comprising one or several blade pairs (11,12). On the edge (13) of a first blade (11), and similarly on the edge (15) of a second blade (12), has by grinding been produced a micro-rounding, and on the apex of the first blade (11) has been produced a bead (14). The radius (r) applied in micro-rounding is advantageously within 0.5-μm, and the dimension of the bead is advantageously within 0.1-1 mm.

24 Claims, 2 Drawing Sheets

BLADE CONSTRUCTION FOR USE IN SLICING MATERIAL WEBS

This is a continuation of application Ser. No. 07/208,163 filed Jun. 16, 1988 now abandoned.

The present invention concerns a blade construction for use in longitudinally cutting, or slicing, material webs, such as various paper and cardboard webs, films, recorder tapes, etc., with said cutter a material web being parted longitudinally into partial webs, and the cutter consisting of a blade construction composed of one or several blade pairs.

The cutting blades of this kind of cutter consist of blade pairs, and endeavours have been made to improve the service life of said cutters by using circular blades made of a wear-resistant and hard but brittle material. The material of the blade edges may be e.g. ceramic, or a hard metal.

The so-called shear-cutting method applied in longitudinal cutting implies that the cutter blades are pressed against each other with a force which acts axially to the blades. Because of the toe-in of the blades, the blades are in contact at one point. The force that is applied and the point contact cause a high stress concentration on the edges of the blades. When brittle blade materials are used, the stress concentration easily exceeds the ultimate strength of the material, and small fractures result on the blade edges. Damaged blades are, of course, unfit for use.

The object of the invention is to provide an improvement in the blade construction of cutting blades used in longitudinal cutting. A more detailed aim of the invention is to provide a blade construction enabling the stress concentration on the blade edges to be reduced so that no chipping of blade edges will occur.

The aims of the invention are achieved with a blade construction which is mainly characterized in that on the edge of the first blade, and similarly on the edge of the second blade, has by grinding been produced a micro-rounding, and that on the apex of the first blade has been produced a bead. In the present context, the term bead is understood to mean a narrow cylinder produced by grinding on the apex of the blade.

The radius applied in the micro-rounding is advantageously within 0.5 to 10 μm . The size of the bead is advantagoeusly within 0.1 to 1 mm.

In the blade construction of the invention, the ground micro-rounding and the bead reduce the stress concentration at the contact point to such a degree that the ultimate strength of the material will not be exceeded. The dimensions of the micro-rounding and the bead depend on the blade force used and on the material to be sliced. When material webs are sliced with the blade construction of the invention, an excellent cut is obtained for instance in paper. The most common application of the blade construction of the invention is therefore the slicing of thin material webs in particular.

The invention is described in detail referring to an advantageous embodiment of the invention presented in the figures of the drawing attached, yet to which the invention is not meant to be exclusively confined.

FIG. 1 presents, in sectional view, an advantageous embodiment of the blade construction of the invention, at the contact point of the blades.

Figure 1:
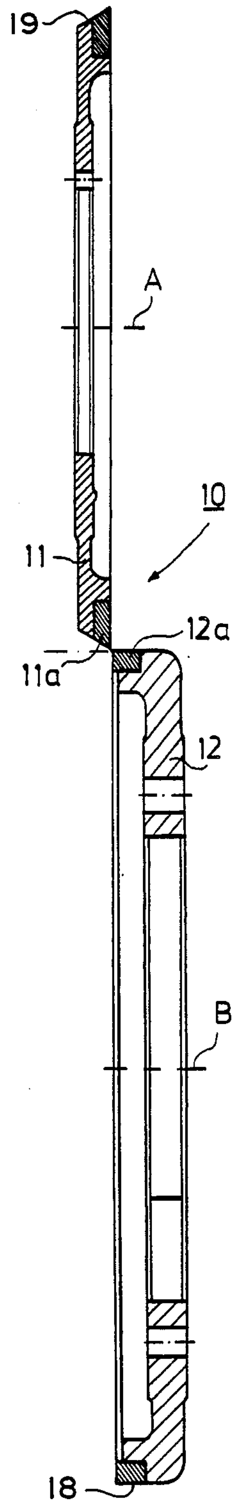
Figure 2:
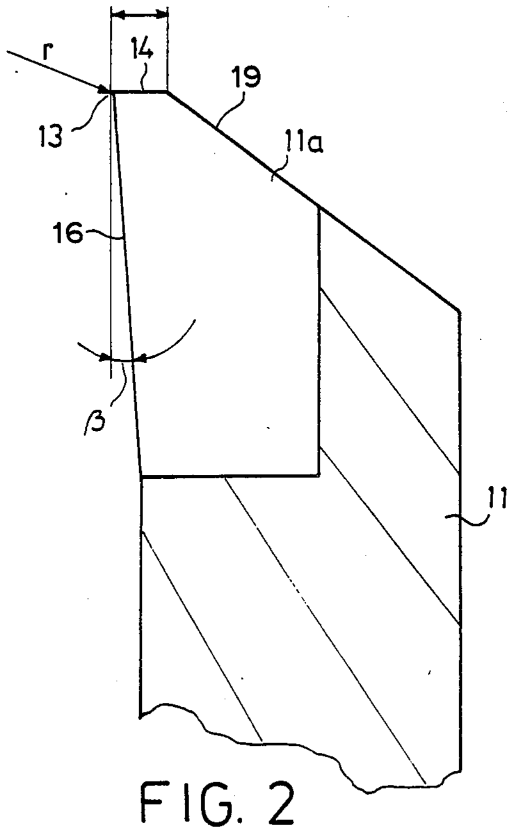
FIG. 2 shows the upper blade and its geometry.
Figure 3:
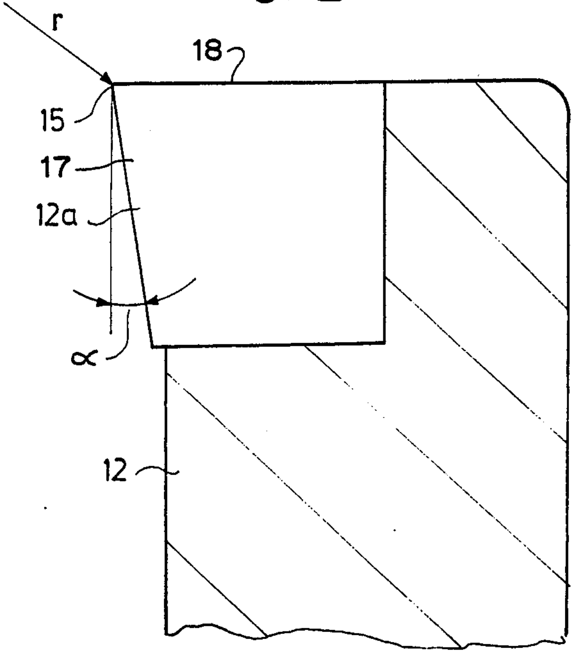
FIG. 3 shows the lower blade and its geometry.

In the embodiment of FIGS. 1–3, the blade construction of the invention in general is indicated by reference numeral 10. In the present embodiment, the blade constuction 10 consists of an upper blade 11 and a lower blade 12. The hard metal part of the upper blade 11 is indicated by reference numeral 11*a* and the hard metal part of the lower blade 12, by reference numeral 12*a*. The cutting edge of the upper blade 11 is indicated by reference numeral 13 and is defined between a surface 16 and a bead 14, and the cutting edge of the lower blade 12 is indicated by reference numeral 15 and is defined between two surfaces 17 and 18. In the present embodiment, the pair of blades is so disposed that the upper blade 11 is substantially conical. The clearing angle of the upper blade 11 is denoted with $\alpha$, and the clearing angle of the lower blade is similarly denoted with $\beta$.

The magnitude of the angle $\alpha$ is within 0°–5°, advantageously about 2°, and the magnitude of the angle $\beta$ is within 0°–5°, advantageously about 1°.

The blades 11 and 12 are circular blades. The central axis of the blade 11 is indicated by A and that of the blade 12s by B.

As taught by the basic idea of the invention, the hard metal part 11*a* of the upper blade is micro-rounded at the edge 13, and similarly the hard metal part 12*a* of the lower blade 12 is micro-rounded at the edge 15. The radius r of the micro-rounding applied is advantageously within 0.5–10 μm. Furthermore, in the present embodiment the bead 14 is produced on the hard metal part 11*a* of the upper blade 11, its dimension advantageously within 0.1–1 mm.

As shown in FIG. 1, the peripheral surface 19 of the upper blade 11 is conical and the peripheral surface 18 of the lower blade 12 is cylindrical. The bead 14 is defined by a generatrix that is substantially parallel to the axis A, and extends between the cutting edge 13 of the blade 11 and a second edge, which is defined between the bead and the conical peripheral surface 19 of the blade. The peripheral surface 19 is at an acute angle to the surface 16. The peripheral surface 18 of the blade 12 is defined by a generatrix that is substantially parallel to the axis B. The peripheral surface 18 of the lower blade is substantially wider than the bead 14.

In the foregoing is presented only one advantageous embodiment of the invention, and it is obvious to a person skilled in the art that numerous modifications thereof are feasible within the scope of the inventive idea stated in the claims following below.

I claim:

1. A cutter for use in longitudinally cutting a material web into partial webs, comprising at least one blade pair composed of a first blade and a second blade, each having a cutting edge, the cutting edges being in point contact and in shearing relationship and each being micro-rounded to a radius within the range from about 0.5 μm to about 10 μm, and only the first blade having a bead adjacent its cutting edge.

2. A cutter according to claim 1, wherein the bead is defined between the cutting edge of the first blade and a second edge thereof, and the first blade has a first surface that meets the bead at the cutting edge and a second surface that meets the bead at said second edge, the first surface being at an angle in the range from about 85° to about 90° to the bead.

3. A cutter according to claim 2, wherein the first surface is at an angle of about 89° to the bead.

4. A cutter according to claim 2, wherein the second blade has a first surface and a second surface that meet at the cutting edge of the second blade, the first surface being at an angle in the range from about 85° to about 90° to the second surface.

5. A cutter according to claim 4, wherein the first surface of the second blade is at an angle of about 88° to the second surface thereof.

6. A cutter according to claim 4, wherein the second surface of the second blade is defined by a generatrix perpendicular to the cutting edge of the second blade, and the bead of the first blade is defined by a generatrix perpendicular to the cutting edge of the first blade, the two generatrices being substantially parallel.

7. A cutter according to claim 2, wherein the perpendicular distance between the cutting edge and the second edge of the first blade is in the range from about 0.1 mm to about 1 mm.

8. A cutter according to claim 2, wherein the second surface of the first blade is at an acute angle to the first surface thereof.

9. A cutter according to claim 1, wherein the bead has a width in the range from about 0.1 mm to about 1.0 mm and is defined between the cutting edge of the first blade and a second edge thereof, and the first blade has a first surface that meets the bead at the cutting edge at an angle in the range from about 85 degrees to about 90 degrees and a second surface that meets the bead at said second edge and is at an acute angle to the first surface of the first blade, and wherein the second blade has a first surface and a second surface that meet at the cutting edge of the second blade at an angle in the range from about 85 degrees to about 90 degrees, and wherein the second surface of the second blade is defined by a generatrix perpendicular to the cutting edge of the second blade and the bead is defined by a generatrix perpendicular to the cutting edge of the first blade, the two generatrices being substantially parallel and the second surface of the second blade being substantially wider than the bead.

10. A cutter according to claim 9, wherein the first surface of the first blade meets the bead at an angle of about 89 degrees and the first surface of the second blade meets the second surface thereof at an angle of about 88 degrees.

11. A cutter according to claim 9, wherein the first surface of the first blade is at a first predetermined angle to the bead and the first surface of the second blade is at a second predetermined angle to the second surface thereof, the second predetermined angle being about 1 degree smaller than the first predetermined angle.

12. A disk cutter for use in longitudinally cutting a material web into partial webs, comprising at least one blade pair composed of a first circular blade and a second circular blade rotatable about respective axes of rotation, each blade having a circular cutting edge, the cutting edges being in point contact and in shearing relationship and each being micro-rounded to a radius within the range from about 0.5 $\mu$m to about 10 $\mu$m and only the first blade having, adjacent its cutting edge, a bead that extends substantially parallel to the axis of rotation of the first blade.

13. A cutter according to claim 12, wherein the bead is defined between the cutting edge of the first blade and a second edge thereof, and the first blade has a first surface that meets the bead at the cutting edge and a second surface that meets the bead at said second edge, the first surface being at an angle in the range from about 85° to about 90° to the bead.

14. A cutter according to claim 13, wherein the first surface is at an angle of about 89° to the bead.

15. A cutter according to claim 13, wherein the second blade has a first surface and a second surface that meet at the cutting edge of the second blade, the first surface being at an angle in the range from about 85° to about 90° to the second surface.

16. A cutter according to claim 15, wherein the first surface of the second blade is at an angle of about 88° to the second surface thereof.

17. A cutter according to claim 15, wherein the bead of the first blade is defined by a first generatrix perpendicular to the cutting edge of the first blade and the second surface of the second blade is defined by a second generatrix perpendicular to the cutting edge of the second blade, the first and second generatrices being substantially parallel to the axes of rotation of the first and second blades respectively.

18. A cutter according to claim 13, wherein the perpendicular distance between the cutting edge and the second edge of the first blade is in the range from about 0.1 mm to about 1 mm.

19. A cutter according to claim 13, wherein the second surface of the first blade is at an acute angle to the first surface thereof.

20. A cutter according to claim 13, wherein the first blade is conical and is disposed above the second blade.

21. A cutter according to claim 20, wherein the second blade is cyclindrical.

22. A cutter according to claim 12, wherein the bead has a width in the range from about 0.1 mm to about 10 mm and is defined between the cutting edge of the first blade and a second edge thereof, and the first blade has a first surface that meets the bead at the cutting edge at an angle in the range from about 85 degrees to about 90 degrees and a second surface that meets the bead at said second edge and is at an acute angle to the first surface of the first blade, and wherein the second blade has a first surface and a second surface that meet at the cutting edge of the second blade at an angle in the range from about 85 degrees to about 90 degrees, and wherein the bead is defined by a first generatrix perpendicular to the cutting edge of the first blade and the second surface of the second blade is defined by a second generatrix perpendicular to the cutting edge of the second blade, the first and second generatrices being substantially parallel to the axis of rotation of the first and second blades respectively and the second surface of the second blade being substantially wider than the bead.

23. A cutter according to claim 22, wherein the first surface of the first blade meets the bead at an angle of about 89 degrees and the first surface of the second blade meets the second surface thereof at an angle of about 88 degrees.

24. A cutter according to claim 22, wherein the first surface of the first blade is at a first predetermined angle to the bead and the first surface of the second blade is at a second predetermined angle to the second surface thereof, the second predetermined angle being about 1 degree smaller than the first predetermined angle.

* * * * *